United States Patent Office 3,608,231
Patented Sept. 28, 1971

3,608,231
POUR DEPRESSANT COMPOSITION
William M. Sweeney, Wappingers Falls, N.Y., assignor to Texaco Inc., New York, N.Y.
No Drawing. Continuation-in-part of application Ser. No. 688,672, Dec. 7, 1967. This application Apr. 15, 1969, Ser. No. 816,373
Int. Cl. C10l 1/18
U.S. Cl. 44—62                                    4 Claims

ABSTRACT OF THE DISCLOSURE

Pour depressant composition comprising a cracked and oxidized ethylene-propylene-dicyclopentadiene - terpolymer and mineral oil compositions containing same.

---

This invention relates to an improved pour depressant composition and to a mineral oil composition containing same. The pour depressant is effective for substantially reducing the pour point of liquid hydrocarbons including fuel oils, diesel oils, and middle distillates. The pour depressant composition is also useful as an additive for gasoline wherein the composition acts as a modifier of induction system deposits.

Heating oils, diesel fuels and liquid hydrocarbon oils employed in cold climates or exposed to low temperatures often require that a pour depressant additive be incorporated therein to maintain their fluidity at low temperatures. While numerous pour depressants are known, many are unsatisfactory from the standpoint of the high concentration of pour depressant required, high cost, or because they do not lower the pour point to the required temperature. An effective pour depressant is one which will substantially reduce the pour point of a treated oil when used in an economical small concentration without imparting any undesirable effects.

The present application is a continuation-in-part of an application S.N. 688,672, filed Dec. 7, 1967, and now abandoned, which is an improvement of an invention that is the subject of a copending application, S.N. 571,970, now U.S. 3,499,741. It has been discovered that a certain terpolymer of the pending application, which possesses good pour depressant activity, can be further treated to produce a product that is more effective as a pour depressant for mineral oil compositions. While the reason for this is not understood, it is believed that oxidation of the relatively low molecular weight (low inherent viscosity) terpolymer rearranges the polymer structure making it an unexpectedly good pour depressant. It has also been discovered that this effect is specific for terpolymers containing dicyclopentadiene, an opposite effect having been observed with some terpolymers formed using other olefins. This invention is directed to the novel pour depressant and to a mineral oil composition containing the pour depressant.

The pour depressant of this invention is an amorphous, cracked, ethylene-propylene-dicyclopentadiene - terpolymer, consisting of polymerized ethylene, propylene and dicyclopentadiene in the proportions of 10 to 90 mole percent ethylene, 5 to 70 mole percent propylene and 0.1 to 20 mole percent of dicyclopentadiene having an inherent viscosity of from 0.2 to 1.80 which has been oxidized while being maintained at a temperature ranging from about 200 to 400° C. Preferably, the pour depressant consists of from 50 to 90 mole percent ethylene, 5 to 45 mole percent propylene and 1 to 5 mole percent dicyclopentadiene having an inherent viscosity in the range of 0.3 to 1.5 which has been oxidized as above.

The inherent viscosity equals the natural log of the specific viscosity divided by the concentration in grams per one hundred ml. The specific viscosity for this equation is the expression of a ratio of the viscosity of the solution divided by the viscosity of the solvent (see Appendix D, p. 103, Report No. 4 in "Polymer Chemistry" by Robert Magovern, Stanford Research Institute, April 1965).

The pour depressant of the invention is prepared from a cracked, amorphous ethylene-propylene-dicyclopentadiene-terpolymer consisting of ethylene, propylene and dicyclopentadiene in the proportions of 10 to 90 mole percent ethylene, 5 to 70 mole percent propylene and 0.1 to 20 mole percent dicyclopentadiene having an inherent viscosity in the range of 0.2 to 1.80. These ethylene-propylene-dicyclopentadiene-terpolymers can be prepared by conventional polymerization methods, as set forth in application S.N. 571,970, now U.S. 3,499,741. In general, a mixture of the ethylene, propylene and dicyclopentadiene in a suitable solvent is polymerized under atmospheric or superatmospheric pressure in the presence of a catalyst, such as a Zeigler-Natta catalyst, to produce an amorphous terpolymer product. Terpolymers having a broad range of inherent viscosities can be so prepared by varying the concentration of the olefin components, the concentration and specific nature of the catalyst employed as well as the polymerization reaction temperature and the time of reaction. This terpolymer is then cracked to produce an effective pour depressant of the noted copending application, the cracking being effected by any conventional cracking process although thermal cracking is preferred. Thermal cracking is accomplished by heating the terpolymer to a temperature in the range of 250 to 450° C. and holding the terpolymer at the selected temperature until the copolymer has been cracked. Generally, cracking is effected under such conditions in a period of time ranging from about 15 seconds to 10 hours although longer periods can be used. It is preferred to effect thermal cracking at a temperature from about 300 to 400° C. in a time period from about 3 to 30 minutes. Thermal cracking is conducted in any vessel or reaction zone which can maintain the terpolymer in the noted temperature range. Alternatively, the terpolymer can be dissolved in a carrier, such as mineral oil, and the mixture treated as above to crack the terpolymer. Cracking the terpolymer in a mineral oil carrier gives a pour depressant-oil mixture which is convenient to handle and use. The terpolymer can be catalytically cracked by contacting the terpolymer with a cracking catalyst at an elevated temperature, generally in the range of 150 to 400° C. until an amorphous, cracked terpolymer having an inherent viscosity in the range of 0.2 to 1.80 is produced. The preferred amorphous cracked terpolymer consists of 50 to 90 mole percent ethylene, 5 to 45 mole percent propylene and 1 to 5 mole percent of dicyclopentadiene having an inherent viscosity in the range of 0.3 to 1.50.

The pour depressant of the present invention is prepared by treating the above-noted terpolymer with an oxygen-containing gas at a temperature ranging from about 200° C. to 400° C. This treatment can be effected with oxygen, air or any convenient mixture of oxygen with nitrogen or another inert gas. The oxidation is conducted in the noted temperature range generally for a period of time ranging from about 1 to 60 minutes.

The pour depressant of this invention is employed in middle distillate mineral oils in a concentration ranging from about 0.001 to 1 weight percent. The preferred concentration of the pour depressant is an amount in the range of 0.005 to 0.02 weight percent which corresponds to about 15 to 60 p.t.b. (pounds per thousand barrels).

The pour depressant effect of the oxidized terpolymer of the invention and of the starting terpolymer prepared above were compared by testing the additives for their pour depressant properties in middle distillate mineral oils having the following inspection values:

SPECIFICATIONS FOR MIDDLE DISTILLATE FUEL

|  | A | B |
| --- | --- | --- |
| Gravity | 34.9 | 32.9 |
| ASTM pour, °F | −15 | −10 |
| Flash point, °F | 166 | 164 |
| FIA analysis: |  |  |
| Aromatics, percent | 29.5 | 33.5 |
| Olefins, percent | 8.5 | 4.0 |
| Saturates, percent | 62.0 | 62.5 |
| ASTM distillation, °F.: |  |  |
| IBP | 365 | 394 |
| 10 | 412 | 411 |
| 20 |  | 435 |
| 50 | 488 | 493 |
| 90 | 559 | 578 |
| EP | 598 | 580 |

The following examples illustrate the preparation of the pour depressant of the invention and their effectiveness for lowering the pour point of the middle distillate fuel oils.

EXAMPLE 1

An amorphous, commercially, available terpolymer consisting of about 59 mole percent ethylene, 40 mole percent propylene and about 1 mole percent dicyclopentadiene supplied as a 50 percent solution in naphthenic oil was obtained. An equal weight of mineral oil was added to the solution and the mixture was thermally cracked at 350° C. for 7 min. to an oil solution of an amorphous, cracked terpolymer having an inherent viscosity of about 0.822. This cracked mixture of the starting terpolymer in mineral oil is called Terpolymer A Solution.

A portion of Terpolymer A Solution was oxidized by heating it to 250° C. and passing a mixture of nitrogen and air therethrough for 10 minutes, the gas mixture consisting of 1 part nitrogen and 1 part air. The resulting oil solution of the oxidized terpolymer in mineral oil was called Terpolymer B Solution. The infrared spectre showed strong carbonyl bond absorption in the 5.8 micron regions. The terpolymer contained in this solution had an inherent viscosity of 0.835.

A middle distillate base fuel A having a pour point of −15° F. to which 100 p.t.b. of Terpolymer A Solution (containing 25 p.t.b. of Terpolymer A) was added had its pour point depressed to −20° F. The same middle distillate fuel to which had been added 100 p.t.b. of terpolymer B Solution (containing 25 p.t.b. of Terpolymer B) had its pour point depressed to −35° F.

EXAMPLE 2

About 50 grams of a commercially available 50 percent naphthenic oil solution of an amorphous terpolymer consisting of about 59 mole percent ethylene, 40 mole percent propylene and about 1 mole percent dicyclopentadiene were added to 150 grams of a mineral oil. This mixture was heated at 320° C. for 15 minutes to crack the terpolymer. The terpolymer in the mixture after cracking had an inherent viscosity of about 1.50. The cracked terpolymer-oil mixture had an iodine number of 7.5, no carbonyl bond absorption in the 5.8 micron infrared region and contained about 13 percent terpolymer by dialysis. This mixture was called Terpolymer C Solution.

About 180 grams of Terpolymer C Solution was oxidized by blowing with a mixture of 2 parts of air to 1 part of nitrogen at 320° C. for 10 minutes. The product, called Terpolymer D Solution had an iodine number 17.0 and strong absorption in the carbonyl region, and the terpolymer contained within the solution had an inherent viscosity of 1.04.

These terpolymers were tested for pour depressant activity in a furnace oil, B, which had a pour point of −10° F. 100 p.t.b. (pounds per thousand barrels) of Terpolymer C Solution (containing 13 p.t.b. of terpolymer C) reduced the pour point of the middle distillate furnace oil to −15° F. 100 p.t.b. of Terpolymer D Solution (containing 13 p.t.b. of terpolymer D) lowered the pour point of the furnace oil to −30° F.

The following examples are comparative examples and serve to illustrate the surprising nature of the claimed invention.

EXAMPLE 3

An amorphous, commercially available terpolymer consisting of about 66 mole percent ethylene, 33 mole percent propylene and about 1 mole percent 1,4-hexadiene was obtained. An equal weight of a paraffinic mineral oil having an SUS viscosity at 100° F. of about 100 was mixed with the terpolymer and the mixture heated to 350° F. for 7 to 10 minutes to thermally crack the terpolymer. This cracked terpolymer had an inherent viscosity of 0.798 and an Iodine Number of 9.2 and was employed in the oil solution designated Terpolymer E Solution.

A portion of Terpolymer E Solution was mixed with an equal quantity of the above-noted paraffinic mineral oil and the mixture heated to 350° C. while a mixture of air at 0.5 l./m. (liters per minute) and 0.25 l./m. of nitrogen were bubbled through with stirring for about 10 minutes. This oxidized product, terpolymer F, had an inherent viscosity of 0.507 and an Iodine Number of 21.2.

Terpolymers E and F were each added to samples of middle distillate Fuel B in a concentration of 25 p.t.b. of active material. The oxidized Terpolymer F gave a 10° F. higher pour point in Fuel B than did Terpolymer E under the same conditions. The oxidation of Terpolymer E therefore resulted in a reduction in its effectiveness as a pour point depressant.

EXAMPLE 4

An amorphous, commercially available copolymer consisting of about 40 mole percent ethylene and 60 mole percent propylene was obtained. An equal weight of a paraffinic mineral oil having an SUS viscosity at 100° F. of about 100 was mixed with the copolymer and the mixture heated to 350° F. for 7 to 10 minutes to thermally crack the copolymer. The cracked copolymer had an inherent viscosity of 0.630 and an Iodine Number of 5.4 and was employed in the oil solution designated Copolymer G Solution.

A portion of Copolymer G Solution was mixed with an equal quantity of the above-noted paraffinic mineral oil and the mixture heated to 350° C. while a mixture of air at 0.5 l./m. and 0.25 l./m. of nitrogen were bubbled through with stirring for about 10 minutes. This oxidized product, Copolymer H, had an inherent viscosity of 0.314 and an Iodine Number of 14.8.

Copolymer G was added to middle distillate Fuel B in a concentration of 25 p.t.b. active material. The pour point of the furnace oil was reduced to −20° F.

Copolymer H was added to Fuel B in a concentration of 25 p.t.b. active material. The pour point of the furnace oil was −10° F. which was an increase of 10° F. in pour point rather than the desired decrease from the cracked and oxidized copolymer.

It is evident that oxidation of the pour depressant terpolymer materials containing the dicyclopentadiene according to this invention very substantially improved the effectiveness of the resulting pour depressant. This result was surprising in view of the fact that similar pour depressant materials including a terpolymer containing hexadiene-1,4 were either not improved or reduced in their effectiveness as pour depressants by the oxidation treatment.

Obviously, many modifications and variations of the invention, as hereinbefore set forth, may be made without departing from the spirit and scope thereof, and therefore only such limitations should be imposed as are indicated in the appended claims.

I claim:
1. A middle distillate oil composition comprising a major proportion of a mineral oil having a high pour point and a minor amount effective to substantially lower the pour point of said mineral oil of an amorphous, cracked and oxidized ethylene-propylene-dicyclopentadiene-terpolymer pour depressant consisting of ethylene, propylene and dicyclopentadiene in mole ratios of 10 to 90 mole percent ethylene, 5 to 70 mole percent propylene and 0.1 to 20 mole percent of dicyclopentadiene, said cracked and oxidized terpolymer having an inherent viscosity in the range of 0.2 to 1.80 which has been produced by reacting ethylene, propylene and dicyclopentadiene in suitable proportions under polymerization conditions to produce a high molecular weight terpolymer, subjecting said high molecular weight terpolymer to cracking conditions to produce a cracked terpolymer having an inherent viscosity in the range of 0.2 to 1.80 and subjecting said cracked terpolymer to oxidation with an oxygen-containing gas at a temperature ranging from about 200 to 400° C. for a period ranging from about 1 to 60 minutes.
2. A middle distillate oil composition according to claim 1 in which said amorphous, cracked and oxidized ethylene-propylene-dicyclopentadiene-terpolymer consists of 50 to 90 mole percent ethylene, 5 to 45 mole percent propylene and 1 to 5 mole percent of dicyclopentadiene and said terpolymer has an inherent viscosity in the range of 0.3 to 1.1.
3. A middle distillate oil composition according to claim 1 containing from 0.001 to 1 percent of said ethylene-propylene-dicyclopentadiene-terpolymer pour depressant.
4. A middle distillate composition according to claim 1 in which said terpolymer consists of about 59 mole percent ethylene, 40 mole percent propylene and 1 mole percent dicyclopentadiene.

References Cited
UNITED STATES PATENTS

| | | | |
|---|---|---|---|
| 3,374,073 | 3/1968 | Gergel | 44—62 |
| 3,388,067 | 6/1968 | Takashima et al. | 44—62X |
| 3,388,977 | 6/1968 | Burkard et al. | 44—62 |
| 3,499,741 | 3/1970 | Sweeney | 44—62 |

DANIEL E. WYMAN, Primary Examiner

W. J. SHINE, Assistant Examiner

U.S. Cl. X.R.

44—77